United States Patent
Xue et al.

(10) Patent No.: US 9,889,534 B2
(45) Date of Patent: Feb. 13, 2018

(54) ON-LINE DEBURRING DEVICE OF WHEEL VALVE HOLE

(71) Applicant: CITIC Dicastal CO., LTD, Qinhuangdao (CN)

(72) Inventors: Bowen Xue, Qinhuangdao (CN); Yacong Zhang, Qinhuangdao (CN); Jiandong Guo, Qinhuangdao (CN); Weidong Liu, Qinhuangdao (CN); Yao Zheng, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 62 days.

(21) Appl. No.: 15/172,496

(22) Filed: Jun. 3, 2016

(65) Prior Publication Data
US 2016/0354892 A1    Dec. 8, 2016

(30) Foreign Application Priority Data

Jun. 3, 2015    (CN) .......................... 2015 1 0298234

(51) Int. Cl.
*B24B 9/04*    (2006.01)
*B60C 29/02*    (2006.01)

(52) U.S. Cl.
CPC ................ *B24B 9/04* (2013.01); *B60C 29/02* (2013.01)

(58) Field of Classification Search
CPC .................................. B24B 9/04; B60C 29/02
USPC ........................................................... 451/294
See application file for complete search history.

(56) References Cited

U.S. PATENT DOCUMENTS

| | | | |
|---|---|---|---|
| 5,131,110 A * | 7/1992 | Hadgis .................... | B24B 29/02 15/268 |
| 5,897,273 A * | 4/1999 | Barbosa Leite ...... | B23B 51/102 408/1 R |
| 6,926,593 B1 * | 8/2005 | Carroll ..................... | B24B 9/04 451/358 |
| 2015/0273588 A1 * | 10/2015 | Bowen ..................... | B23B 5/28 82/104 |

* cited by examiner

*Primary Examiner* — Marc Carlson
(74) *Attorney, Agent, or Firm* — Maier & Maier, PLLC

(57) ABSTRACT

The present invention relates to an improved on-line deburring device of a wheel valve hole, having a frame, electric cylinders, an air cylinder, grinding heads, a motor, guide rails and a transmission shaft. In use, the present invention can meet the requirements for deburring the wheel valve hole; meanwhile, the device has the characteristics of high production efficiency, advanced technique, high automation degree, stable performance, etc.

1 Claim, 2 Drawing Sheets

ON-LINE DEBURRING DEVICE OF WHEEL VALVE HOLE

TECHNICAL FIELD

The present invention relates to a deburring device, in particular to an on-line deburring device.

BACKGROUND ART

Burrs are frequently formed in a valve hole after a machining step in the machining production process of an aluminum alloy wheel. If the burrs of the valve hole are not removed thoroughly, a valve is frequently cut when the wheel is driving, leading to air leakage and the great potential safety hazard brought to a driver. A conventional deburring method of the valve hole is characterized by artificially deburring with a deburring cutter, which tends to cause such problems as omission, high labor intensity and low production efficiency. The present invention proposes an on-line automatic deburring device for a valve hole.

SUMMARY OF THE INVENTION

The object of the present invention is to provide a deburring device capable of deburring a wheel valve hole on-line.

In order to accomplish the object, the technical solution of the present invention is as follows: an improved on-line device for deburring the wheel valve hole, comprising a frame, a bottom plate, an electric cylinder I, a servo motor, an flip, a guide rail I, a sliding block, a bearing seat, left shafts, left V-shaped blocks, an air cylinder, right shafts, right V-shaped blocks, a belt wheel I, a synchronous belt I, a belt wheel II, a lower bearing seat, a lower shaft, a lower grinding head, an upper grinding head, an upper bearing seat, an upper shaft, a belt wheel III, a synchronous belt II, a belt wheel IV, a belt wheel V, a motor, an electric cylinder II, a guide rail II, a vertical plate, a belt wheel VI, a synchronous belt III, a transmission shaft, a framework, an electric cylinder III, a sliding plate, a guide rail III and a supporting plate, wherein the bottom plate is fixed on the frame; two ends of the electric cylinder I are hinged between the bottom plate and the flip; the sliding block is fixed above the flip through the guide rail I, wherein the bearing seat is fixed on the upper end of the sliding block; two left shafts, above which two left V-shaped blocks are fixed, are fixed in the bearing seat through bearings; the servo motor is fixed under the sliding block; the output end of the servo motor is connected to the lower end of one left shaft; the output end of the cylinder fixed above the flip is connected with the sliding block; the right shafts are fixed in the bearing seat on the right side of the flip through bearings, and two right V-shaped blocks are fixed on the upper ends of the right shafts.

The lower bearing seat is fixed above a lower plate of the framework; the lower shaft is fixed in the lower bearing seat through a bearing, wherein the lower grinding head is fixed on the upper end of the lower shaft and the belt wheel II is fixed on the lower end of the lower shaft; the upper bearing seat is fixed under an upper plate of the framework; the upper shaft is fixed in the upper bearing seat through a bearing, wherein the upper grinding head is fixed below the upper shaft and the belt wheel III is fixed above the upper shaft; the transmission shaft is mounted between the upper plate and the lower plate of the framework through a bearing and the bearing seat, wherein the belt wheel IV and the belt wheel V are fixed above the transmission shaft and the belt wheel I is fixed below the transmission shaft; the synchronous belt I is mounted between the belt wheel I and the belt wheel II; the synchronous belt II is mounted between the belt wheel III and the belt wheel IV; the motor is mounted above the upper plate of the framework, and the belt wheel VI is fixed on the output end of the motor; the synchronous belt III is mounted between the belt wheel V and the belt wheel VI.

The framework is fixed on the side of the vertical plate through the guide rail II; the electric cylinder II is mounted at the top end of the vertical plate; the output end of the electric cylinder II is connected with the framework; the vertical plate is fixed above the sliding plate; the sliding plate is fixed above the supporting plate through the guide rail III; the supporting plate is fixed on the right side of the frame; the electric cylinder III is fixed on the side of the supporting plate; and the output end of the electric cylinder III is connected with the sliding plate.

In use, the wheel is initially positioned on the roller way; the cylinder moves the sliding block rightwards through the guide rail I, so that two left V-shaped blocks and two right V-shaped blocks firmly clamp the wheel; the servo motor rotates the wheel through the left shafts; after the position of the valve hole is located by a sensor, the electric cylinder I overturns the wheel at a certain angle through the flip, so that the center line of the valve hole is vertical; at the moment, the motor drives the transmission shaft to rotate through the synchronous belt III, so that the synchronous belt I and the synchronous belt II drive the upper grinding head and the lower grinding head to rotate simultaneously; the electric cylinder III moves the framework and the two grinding heads leftwards through the guide rail III, so that the center lines of the two grinding heads coincide with the center line of the valve hole; the electric cylinder II moves the framework, the upper grinding head and the lower grinding head up and down in a reciprocating manner through the guide rail II, and contacts the framework, the upper grinding head and the lower grinding head to be respectively with the valve hole, so the burrs of the valve hole can be removed.

In use, the present invention can meet the requirements for deburring the wheel valve hole; meanwhile, the device has the characteristics of high production efficiency, advanced technique, high automation degree, stable performance, etc.

Figure 1:
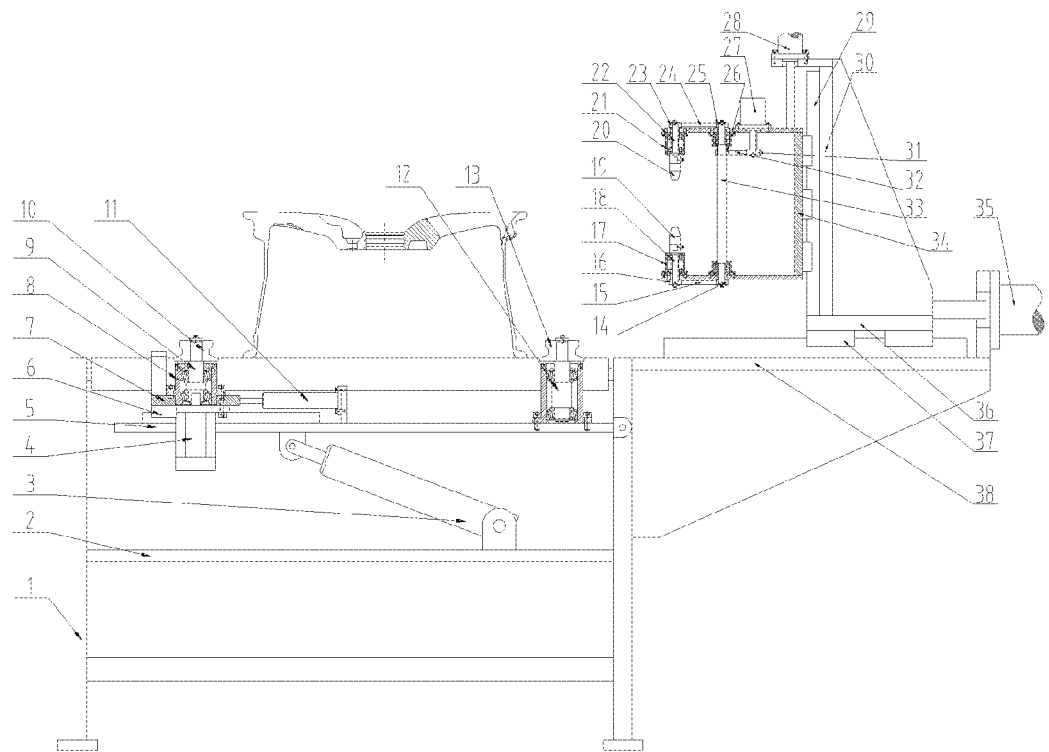
FIG. 1 is a front view of an improved on-line deburring device of a wheel valve hole of the present invention.
Figure 2:
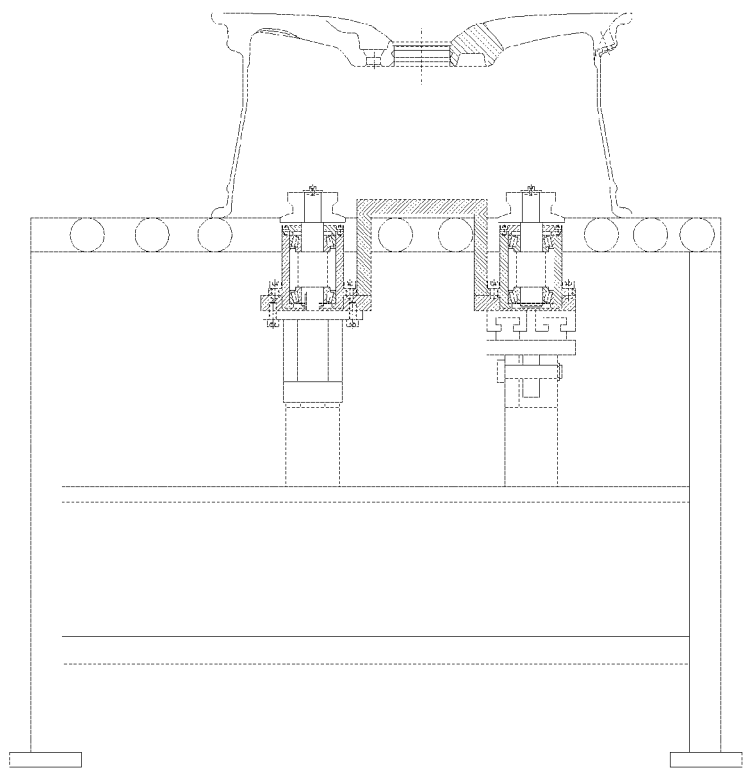
FIG. 2 is a left view of an improved on-line deburring device of a wheel valve hole of the present invention.
Figure 3:
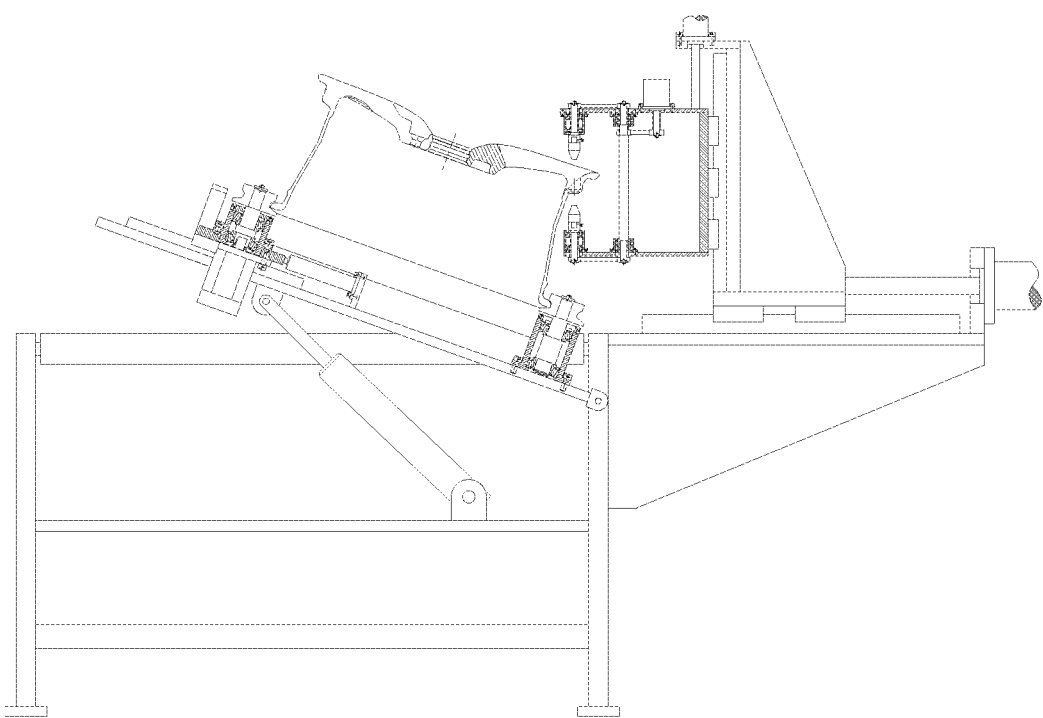
FIG. 3 is a front view of an improved on-line deburring device of a wheel valve hole of the present invention during working.

As shown in drawings, 1—a framework, 2—a bottom plate, 3—an electric cylinder I, 4—a servo motor, 5—a flip, 6—a guide rail I, 7—a sliding block, 8—a bearing seat, 9—a left shaft, 10—a left V—shaped block, 11—an air cylinder, 12—a right shaft, 13—a right V—shaped block, 14—a belt wheel I, 15—a synchronous belt I, 16—a belt wheel II, 17—a lower bearing seat, 18—a lower shaft, 19—a lower grinding head, 20—an upper grinding head, 21—an upper bearing seat, 22—an upper shaft, 23—a belt wheel III, 24—a synchronous belt II, 25—a belt wheel IV, 26—a belt wheel V, 27—a motor, 28—an electric cylinder II, 29—a guide rail II, 30—a vertical plate, 31—a belt wheel VI, 32—a synchronous belt III, 33—a transmission shaft, 34—a framework, 35—an electric cylinder III, 36—a sliding plate, 37—a guide rail III, and 38—a supporting plate.

DETAILED DESCRIPTION OF THE INVENTION

The details and the working conditions of the specific device disclosed by the present invention are illustrated in combination with the attached drawings as follows.

The device comprises a frame 1, a bottom plate 2, an electric cylinder I 3, a servo motor 4, an flip 5, a guide rail I 6, a sliding block 7, a bearing seat 8, left shafts 9, left V-shaped blocks 10, an air cylinder 11, right shafts 12, right V-shaped blocks 13, a belt wheel I 14, a synchronous belt I 15, a belt wheel II 16, a lower bearing seat 17, a lower shaft 18, a lower grinding head 19, an upper grinding head 20, an upper bearing seat 21, an upper shaft 22, a belt wheel III 23, a synchronous belt II 24, a belt wheel IV 25, a belt wheel V 26, a motor 27, an electric cylinder II 28, a guide rail II 29, a vertical plate 30, a belt wheel VI 31, a synchronous belt III 32, a transmission shaft 33, a framework 34, an electric cylinder III 35, a sliding plate 36, a guide rail III 37 and a supporting plate 38, wherein the bottom plate 2 is fixed on the frame 1; two ends of the electric cylinder 3 are hinged between the bottom plate 2 and the flip 5; the sliding block 7 is fixed above the flip 5 through the guide rail I 6, and the bearing seat 8 is fixed on the upper end of the sliding block 7; two left shafts 9, above which two left V-shaped blocks 10 are fixed, are fixed in the bearing seat 8 through bearings; the servo motor 4 is fixed under the sliding block 7; the output end of the servo motor 4 is connected to the lower end of one left shaft 9; the output end of the cylinder 11 fixed above the flip 5 is connected with the sliding block 7; the right shafts 12 are fixed in the bearing seat 8 on the right side of the flip 5 through bearings, and two right V-shaped blocks 13 are fixed on the upper ends of the right shafts 12.

The lower bearing seat 17 is fixed above a lower plate of the framework 34; the lower shaft 18 is fixed in the lower bearing seat 17 through a bearing, wherein the lower grinding head 19 is fixed on the upper end of the lower shaft 18 and the belt wheel II 16 is fixed on the lower end of the lower shaft 18; the upper bearing seat 21 is fixed under the upper plate of the framework 34; the upper shaft 22 is fixed in the upper bearing seat 21 through a bearing, wherein the upper grinding head 20 is fixed below the upper shaft 22 and the belt wheel III 23 is fixed above the upper shaft 22; the transmission shaft 33 is mounted between the upper plate and the lower plate of the framework 34 through a bearing and the bearing seat, wherein the belt wheel IV 25 and the belt wheel V 26 are fixed above the transmission shaft 33 and the belt wheel I 14 is fixed below the transmission shaft 33; the synchronous belt I 15 is mounted between the belt wheel I 14 and the belt wheel II 16; the synchronous belt II 24 is mounted between the belt wheel III 23 and the belt wheel IV 25; the motor 27 with the output end mounted with the belt wheel VI 31 is mounted above the upper plate of the framework 34; the synchronous belt III 32 is mounted between the belt wheel V 26 and the belt wheel VI 31; the framework 34 is fixed on the side of the vertical plate 30 through the guide rail II 29; the electric cylinder II 28 is mounted at the top end of the vertical plate 30; the output end of the electric cylinder II 28 is connected with the framework 34; the vertical plate 30 is fixed above the sliding plate 36; the sliding plate 36 is fixed above the supporting plate 38 through the guide rail III 37; the supporting plate 38 is fixed on the right side of the frame 1; the electric cylinder III 35 is fixed on the side of the supporting plate 38; and the output end of the electric cylinder III 35 is connected with the sliding plate 36.

In the working process, the wheel is initially positioned on a roller way; the cylinder 11 move the sliding block 7 rightwards through the guide rail I 6, so that the two left V-shaped blocks 10 and the two right V-shaped blocks 13 firmly clamp the wheel; the servo motor 4 rotates the wheel through the left shafts 9; after the position of the valve hole is located by a sensor, the electric cylinder I 3 overturns the wheel at a certain angle through the flip 5, so that the center line of the valve hole is vertical; at the moment, the motor 27 drives the transmission shaft 33 to rotate through the synchronous belt III 32, so that the synchronous belt I 15 and the synchronous belt II 24 drive the upper grinding head 20 and the lower grinding head 19 to rotate simultaneously; the electric cylinder III 35 moves the framework 34 and the two grinding heads leftwards through the guide rail III 37, so that the center lines of the two grinding heads coincide with the center line of the valve hole; the electric cylinder II 28 moves the framework 34, the upper grinding head 20 and the lower grinding head 19 up and down in a reciprocating manner through the guide rail II 29 and contacts the framework, the upper grinding head and the lower grinding head respectively with the valve hole, so the burrs of the valve hole can be removed.

The invention claimed is:

1. An improved on-line deburring device of a wheel valve hole in a wheel rim, comprising:
   a frame, a bottom plate, an electric cylinder I, a servo motor, a flip, a guide rail I, a sliding block, a left bearing seat, at least one left shaft, at least one left V-shaped block, an air cylinder, a right bearing seat, at least one right shaft, at least one right V-shaped block, a belt wheel I, a synchronous belt I, a belt wheel II, a lower bearing seat, a lower shaft, a lower grinding head, an upper grinding head, an upper bearing seat, an upper shaft, a belt wheel III, a synchronous belt II, a belt wheel IV, a belt wheel V, a motor, an electric cylinder II, a guide rail II, a vertical plate, a belt wheel VI, a synchronous belt III, a transmission shaft, a framework, an electric cylinder III, a sliding plate, a guide rail III and a supporting plate,
   wherein the bottom plate is fixed on the frame; the flip is pivotally attached to the frame; two ends of the electric cylinder I are hinged between the bottom plate and the flip; the sliding block is fixed above the flip through the guide rail I, and the left bearing seat is fixed on an upper end of the sliding block; the at least one left shaft is fixed in the left bearing seat through bearings, and the at least one left V-shaped block is fixed above the at least one left shaft; the servo motor is fixed under the sliding block; a servo motor shaft of the servo motor is connected to a lower end of the at least one left shaft; an output end of the air cylinder fixed above the flip is connected with the sliding block; the at least one right shaft is fixed in the right bearing seat on the right side of the flip through bearings, and the at least one right V-shaped block is are fixed on the upper end of the at least one right shaft; wherein the air cylinder is configured to reciprocate the at least one left V-shaped block relative to the at least one right V-shaped block to clamp the wheel rim to the flip; wherein the servo motor is configured to rotate the at least one left V-shaped block to rotate the wheel rim about its axis while clamped; and wherein the electric cylinder I is configured to pivot the flip relative to the frame to orient the wheel rim in at least a horizontal orientation and an inclined deburring orientation, the lower bearing seat is fixed above a lower plate of the framework; the lower shaft is fixed in the lower bearing seat through a bearing, wherein the lower grinding head is fixed on the upper end of the lower shaft and the belt wheel II is fixed on the lower end of the lower shaft; wherein the lower grinding head is configured to deburr a bottom edge of the wheel valve hole of the wheel rim while in the inclined deburring orientation;

the upper bearing seat is fixed under an upper plate of the framework; the upper shaft is fixed in the upper bearing seat through a bearing, wherein the upper grinding head is fixed on the lower end of the upper shaft and the belt wheel III is fixed on the upper end of the upper shaft; wherein the upper grinding head is configured to deburr a top edge of the wheel valve hole of the wheel rim while in the inclined deburring orientation;

the transmission shaft is mounted between the upper plate and the lower plate of the framework through a top bearing and a bottom bearing, the belt wheel IV and the belt wheel V are fixed on the upper end of the transmission shaft and the belt wheel I is fixed on the lower end of the transmission shaft; the synchronous belt I is mounted between the belt wheel I and the belt wheel II; the synchronous belt II is mounted between the belt wheel III and the belt wheel IV; the motor with a motor shaft mounted with the belt wheel VI is mounted above the upper plate of the framework; the synchronous belt III is mounted between the belt wheel V and the belt wheel VI; wherein the motor is configured to rotate the transmission shaft through the synchronous belt III which simultaneously rotates the upper grinding head and lower grinding head through the synchronous belt II and synchronous belt I, the framework is fixed on the side of the vertical plate through the guide rail II; the electric cylinder II is mounted at the top end of the vertical plate; an output end of the electric cylinder II is connected with the framework; wherein the electric cylinder II is configured to vertically reciprocate the upper grinding head and lower grinding head attached to the framework upward and downward;

the vertical plate is fixed above the sliding plate; the sliding plate is fixed above the supporting plate through the guide rail III; the supporting plate is fixed on the right side of the frame; and the electric cylinder III is fixed on the side of the supporting plate; and an output end of the electric cylinder III is connected with the sliding plate; wherein the electric cylinder III is configured to horizontally reciprocate the upper grinding head and lower grinding head attached to the vertical plate through the framework toward and away from the wheel rim.

\* \* \* \* \*